(12) United States Patent
Hennon

(10) Patent No.: US 9,822,907 B1
(45) Date of Patent: Nov. 21, 2017

(54) ANCHOR SEALING HYGIENIC BRACKET

(71) Applicant: John Hennon, Wall, NJ (US)

(72) Inventor: John Hennon, Wall, NJ (US)

(73) Assignee: Syntiro Dynamics LLC, Wall, NJ (US)

( * ) Notice: Subject to any disclaimer, the term of this patent is extended or adjusted under 35 U.S.C. 154(b) by 0 days.

(21) Appl. No.: 14/998,664

(22) Filed: Jan. 29, 2016

Related U.S. Application Data

(60) Provisional application No. 62/176,041, filed on Feb. 9, 2015.

(51) Int. Cl.
| | |
|---|---|
| *F16L 3/22* | (2006.01) |
| *F16M 13/02* | (2006.01) |
| *F16L 3/00* | (2006.01) |
| *F16B 13/04* | (2006.01) |
| *F16L 3/11* | (2006.01) |
| *F16B 33/00* | (2006.01) |

(Continued)

(52) U.S. Cl.
CPC .............. *F16L 3/222* (2013.01); *F16B 13/04* (2013.01); *F16B 13/061* (2013.01); *F16B 23/0084* (2013.01); *F16B 33/004* (2013.01); *F16B 37/145* (2013.01); *F16B 43/001* (2013.01); *F16L 3/00* (2013.01); *F16L 3/11* (2013.01); *F16L 3/133* (2013.01); *F16L 3/22* (2013.01); *F16L 3/221* (2013.01); *F16L 3/223* (2013.01); *F16M 13/02* (2013.01); *F16M 13/027* (2013.01)

(58) Field of Classification Search
CPC ... F16L 3/11; F16L 3/221; F16L 3/222; F16L 3/133; F16L 3/22; F16L 3/223; F16B 43/001; F16B 33/004; F16B 13/04; F16B 37/145; F16B 23/0084; F16B 13/061; F16M 13/027
USPC .................................................. 411/178, 179
See application file for complete search history.

(56) References Cited

U.S. PATENT DOCUMENTS

| 1,462,187 A | * | 7/1923 | Zifferer | .................. F16L 3/133 |
| | | | | 248/58 |
| 1,477,621 A | * | 12/1923 | Zifferer | .................. F16L 3/133 |
| | | | | 248/59 |

(Continued)

FOREIGN PATENT DOCUMENTS

| CA | 2090636 C | * | 9/2003 | ......... B29C 45/2622 |
| DE | 9310346 U1 | * | 9/1993 | ............ F16B 13/061 |

(Continued)

*Primary Examiner* — Eret McNichols
(74) *Attorney, Agent, or Firm* — Z IP Law PLLC

(57) ABSTRACT

An offset hygienic anchor sealing bracket for installation of block style tube and pipe hangers to a paneled strata in which there is no access to the reverse side, there being a need to secure the anchor bracket to an anchor bolt or toggle bolt and simultaneously shield the exposed toggle bolt structure from the environment of the clean room, sterile room, or sanitary room in order to protect the irregular surface of the toggle bolt from caustic cleaning solutions and to prevent the build up of dirt and bacteria, the anchor bracket having bored pedestals in communication with the cavity which encapsulates the exposed portion of the toggle bolt and secures the anchor bracket thereto, the anchor bracket having a plurality of female threaded receptacles for receipt of fasteners utilized in assembling block style tube and pipe hangers, thus securing the block style tube and pipe hanger to the panel at a desired slope and center line.

14 Claims, 7 Drawing Sheets

(51) Int. Cl.
*F16B 37/14* (2006.01)
*F16L 3/223* (2006.01)
*F16L 3/133* (2006.01)
*F16B 43/00* (2006.01)
*F16B 13/06* (2006.01)
*F16B 23/00* (2006.01)

(56) References Cited

U.S. PATENT DOCUMENTS

| | | | | |
|---|---|---|---|---|
| 2,156,639 A * | 5/1939 | Powell | ............... | F16L 3/11 248/59 |
| 2,925,977 A * | 2/1960 | Cononi | ............... | F16L 3/133 248/62 |
| 3,191,730 A * | 6/1965 | Fischer | ............... | E04D 3/3606 277/648 |
| 3,201,906 A * | 8/1965 | Giardina | ............... | E04B 9/18 248/58 |
| 4,442,990 A * | 4/1984 | Krueger | ............... | F16L 3/222 248/62 |
| 5,921,509 A * | 7/1999 | Flood | ............... | E21F 17/02 248/58 |
| 5,996,945 A * | 12/1999 | Coles | ............... | F16L 3/2235 24/16 R |
| 6,361,258 B1 * | 3/2002 | Heesch | ............... | F16B 23/0084 411/178 |
| 7,475,513 B2 * | 1/2009 | Parker | ............... | F16L 3/1091 248/49 |
| 7,543,606 B2 * | 6/2009 | Friedline | ............... | F16L 3/085 138/106 |
| D614,947 S * | 5/2010 | Hennon | ............... | D8/380 |
| 8,475,103 B2 * | 7/2013 | Michalski | ............... | F16B 43/001 411/369 |
| 8,596,589 B2 * | 12/2013 | Hennon | ............... | F16L 3/1091 248/65 |
| 8,628,286 B2 * | 1/2014 | Duvekot | ............... | E04B 1/66 411/369 |
| 8,631,629 B1 * | 1/2014 | Wiener | ............... | F16B 5/0275 126/623 |
| 9,033,289 B2 * | 5/2015 | Hennon | ............... | F16L 3/1091 248/65 |
| 9,038,968 B2 * | 5/2015 | Hennon | ............... | F16L 3/1091 248/65 |
| 9,046,198 B2 * | 6/2015 | Mongiorgi | ............... | F16L 3/2235 |
| 9,188,144 B2 * | 11/2015 | Sano | ............... | F16B 19/1045 |
| 9,199,830 B2 * | 12/2015 | O'Brien | ............... | B66F 3/08 |
| 2006/0048611 A1 * | 3/2006 | Berdin | ............... | B25B 27/0007 81/121.1 |
| 2006/0086765 A1 * | 4/2006 | Harberts | ............... | B60J 10/30 224/309 |
| 2006/0186278 A1 * | 8/2006 | Tjerrild | ............... | F16L 3/133 248/65 |
| 2007/0264099 A1 * | 11/2007 | Huang | ............... | F16B 13/061 411/38 |
| 2010/0320346 A1 * | 12/2010 | Phillips | ............... | F16B 11/006 248/309.1 |
| 2011/0042528 A1 * | 2/2011 | Tucker | ............... | F16L 3/133 248/62 |
| 2011/0163208 A1 * | 7/2011 | Tjerrild | ............... | F16L 3/227 248/65 |
| 2016/0069480 A1 * | 3/2016 | Rego | ............... | F16B 5/065 248/65 |

FOREIGN PATENT DOCUMENTS

| | | | | |
|---|---|---|---|---|
| DE | EP 2466024 A2 * | 6/2012 | ............ | E04B 1/7637 |
| DE | 202013004321 U1 * | 9/2013 | ............ | F16B 5/0258 |
| DE | 102014103976 A1 * | 9/2015 | ............ | F16B 13/061 |
| EP | 1229255 A3 * | 9/2003 | ............ | F16B 13/061 |
| FR | 1233869 A * | 10/1960 | ............ | E04D 3/3605 |
| FR | 2929668 A1 * | 10/2009 | ............ | E05F 5/022 |
| SE | CH 639451 A5 * | 11/1983 | ............ | E04D 3/3603 |

* cited by examiner

ANCHOR SEALING HYGIENIC BRACKET

RELATED APPLICATIONS

Applicant claims the benefit of provisional application Ser. No. 62/176,041, filed Feb. 9, 2015.

BACKGROUND OF THE INVENTION

1. Field of the Invention

The present invention relates to block or rounded style tube and pipe hangers, herein referenced to as block style tube and pipe hangers, and more particularly, to an offset anchor bracket which allows for the block style tube and pipe hangers to be secured to a panel in either a vertical or horizontal orientation wherein the panel is fixed and there may not be access to the reverse side thereof, the anchor bracket covers and seals the fasteners which secure the anchor bracket to the substrate panel. Also, in areas where there is access to the reverse side of the panel, nuts and bolts may be used in place of the anchor to mount the bracket to the panel.

2. Description of the Prior Art

Pipe and tube supports are known for their use in supporting piping and tubing systems in residential and commercial buildings, as well as throughout numerous industrial manufacturing facilities, for example, food, dairy, beverage, chemical, personal care, bio-processing, and pharmaceutical manufacturing industries. Many pipe hanging configurations have either an inner layer or an inner block made from an elastimeric or rigid plastic materials to provide some combination of dampening, shock absorption, and insulation. With respect to industrial facilities, especially those in which clean rooms, sanitary and sterile environments which are critical to the manufacturing process, the known pipe supports must be configured to have a smooth contact surface to prevent the build up of any other contaminants from collecting and impacting the affect of the clean, sanitary, sterile environments. Still further, in such clean rooms and the like, all exposed surfaces must be smooth, which means that no irregular surfaces such as threaded rods, fasteners, crevices, or the like can be exposed to the environment of the clean room. It further means that all surfaces of such supports and frames, must be flush with its underlying strata or support to prevent any build up of dirt or bacteria between the frames and support structure.

The block style hangers for use in the hanging or vertical support of tubing and piping may use plastic or silicone grommets which define an interior diameter (I.D.) to directly support and encompass the outer diameter (O.D.) of a pipe or tube. Silicone or plastic grommets themselves are supported by a metal frame, which is often welded to supporting structural steel or secured by a threaded connection to a hanger in the form of a vertical rod depending from a bracket or plate secured to the ceiling, or extending upwardly from the floor, from a bracket or plate secured to the floor strata. These block style hangers may be used individually or due to their substantially square and rectangular shape, they alternatively can easily and efficiently be stacked in vertical relationship, to provide an offset between multiple piping and tubing arranged in parallel and set the centerlines of the respective tubing or piping. The grommets act as a dampening cushion or insulator between the hardware and the supporting utility. The grommet parts define the molded inner diameter which fits around an outer diameter of the pipe, tube or conduit. The size of the inner diameter of the grommet controls the amount of force required to allow the tube, pipe or conduit to slide through the grommets. A smaller inner diameter creates a tight fit or an anchor, and a larger inner diameter creates a loose fit or guide which allows the tube, pipe or conduit to slide along an axis.

The known grommets and inserts for such hangers are held together and in place around the pipe or conduit solely by the use of mounting hardware and framework or brackets which attach to grommets to one another around the pipe or conduit. The grommets together with the mounting hardware and framework are then secured by means of a support rod to a support plate or support bracket which is secured to the ceiling or ceiling beam, or to a floor bracket in which the rod extends upwardly from the floor supporting the tubing or piping.

In many of the industries mentioned, wherein a clean, sterile room is required, the piping structures are required and are specified to be installed on a slope and centerline with a general slope being from one eighth to one quarter inch drop per foot. This specification requirement is to insure that the tubing or pipeline can self drain via gravity.

A problem arises when tubing or piping must be installed and supported from a ceiling or wall which is covered by a panel and perhaps insulated panels, in a clean, sanitary or sterile room which requires the use of specialized fasteners for securing an anchor bracket to a support panel. Fasteners may include toggle bolts, rivet-like structures, or ordinary nuts and bolts. Also suitable would be brand name fasteners such as Jack Nut and Fab-Lok. These devices will be referred to generally as toggle bolt-like fasteners in the balance of this document. Since the toggle bolt-like structure presents an uneven surface which can collect dirt or bacteria, and often are fabricated from grades of metals which deteriorate in caustic conditions, it is necessary to have an anchor bracket for the block type tubing and piping hanger which can be secured to such toggle bolt-like fastener, yet completely cover the fastener and protect that portion of the toggle bolt-like fastener which extends into the clean, sterile, or sanitary room so that the caustic solutions used in routinely washing or cleaning such rooms will not degrade the fastener, yet allows for support for the anchor bracket for either directing supporting a block type tubing and piping hanger from the frame of the block style tube and pipe hanger, or for supporting a support rod extending outwardly and in communication with a block style tube and pipe hanger for supporting the tubing or piping.

The structural design of the anchor bracket also allows for several methods for sealing the anchor bracket over the portion of the toggle bolt-like fastener which extends into the clean, sterile or sanitary room. This sealing can be accomplished either with an O ring, or with a custom designed sealing pad with silicone caulk. The seal is an important factor because the end user wants to be assured that the inside of the cup does not turn into a depository for bacteria, liquids, or the like.

Applicant has developed an offset anchor bracket which can protect and encapsulate the toggle bolt-like fasteners utilized to secure the anchor bracket to a panel to which access to the reverse side may be denied, and allow the anchor bracket to be secured and adjusted to provide for the correct slope and centerline of the resultant tubing and piping, the anchor bracket having a pair of receivers for direct receipt of the fasteners utilized with the hardware of a block style tube and pipe hanger to secure the hanger or multiple hangers in series directly to the anchor bracket and the underlying panel strata. The anchor bracket is both secured to the panel and protects the irregular surface of the toggle bolt-like fasteners utilized to secure it to the panel, the anchor bracket being fabricated from either stainless steel or from a polymer or elastomeric material which is impervious to and does not react to the caustic solutions utilized in cleaning a clean, sterile or sanitary room.

OBJECTS OF THE INVENTION

An object of the present invention to provide for a novel assembly which simplifies the total installation of a pipe hanger and allows the installer to secure pipe hangers to panels which constitute a ceiling, wall, or floor to which there is no access to the reverse side thereof.

A still further object of the present invention is to provide for a novel support assembly in which the anchor bracket covers and protects the support bolts extending through the panel and encapsulates that portion of the bolt exposed within the clean room to protect it from caustic cleaning solutions or the like utilized to sanitize the clean room.

A further object of the present invention is to provide for a novel support assembly for the installation of block style tube and pipe hangers in which the anchor bracket has a pair of receivers to directly secure a block style tube and pipe hanger either singly or in serial combination.

A still further object of the present invention is to provide for a novel support assembly for a block style tube and pipe hanger in which an anchor bracket is formed with a single receiver to accept a support rod for supporting a block style tube and pipe hanger at a distance from the panel.

A still further object of the present invention is to provide for a novel installation assembly for block style pipe and tube hangers to a panel to which access to the reverse side is denied, allowing the installer to adjust the elevation and centerline and slope of the tubing or piping.

Another object of the present invention is to provide for a novel support structure for block style tube and pipe hangers in which the fasteners utilized in the frame hardware of the block style tube and pipe hangers are used to directly secure the block style tube and pipe hangers to the anchor bracket of the present assembly, and hence the panel to which it is secured.

SUMMARY OF THE INVENTION

An offset hygienic anchor sealing bracket for installation of block, style tube and pipe hangers to a paneled strata in which there is no access to the reverse side, there being a need to secure the anchor bracket to an anchor bolt or toggle bolt and simultaneously shield the exposed toggle bolt structure from the environment of the clean room, sterile room, or sanitary room in order to protect the irregular surface of the toggle bolt from caustic cleaning solutions and to prevent the build up of dirt and bacteria, the anchor bracket having bored pedestals in communication with the cavity which encapsulates the exposed portion of the toggle bolt and secures the anchor bracket thereto, the anchor bracket having a plurality of female threaded receptacles for receipt of fasteners utilized in assembling block style tube and pipe hangers, thus securing the block style tube and pipe hanger to the panel at a desired slope and center line.

BRIEF DESCRIPTION OF THE DRAWINGS

These and other objects of the present invention will become apparent, particularly when taken in light of the following illustrations wherein.

DETAILED DESCRIPTION OF THE INVENTION

Figure 1:
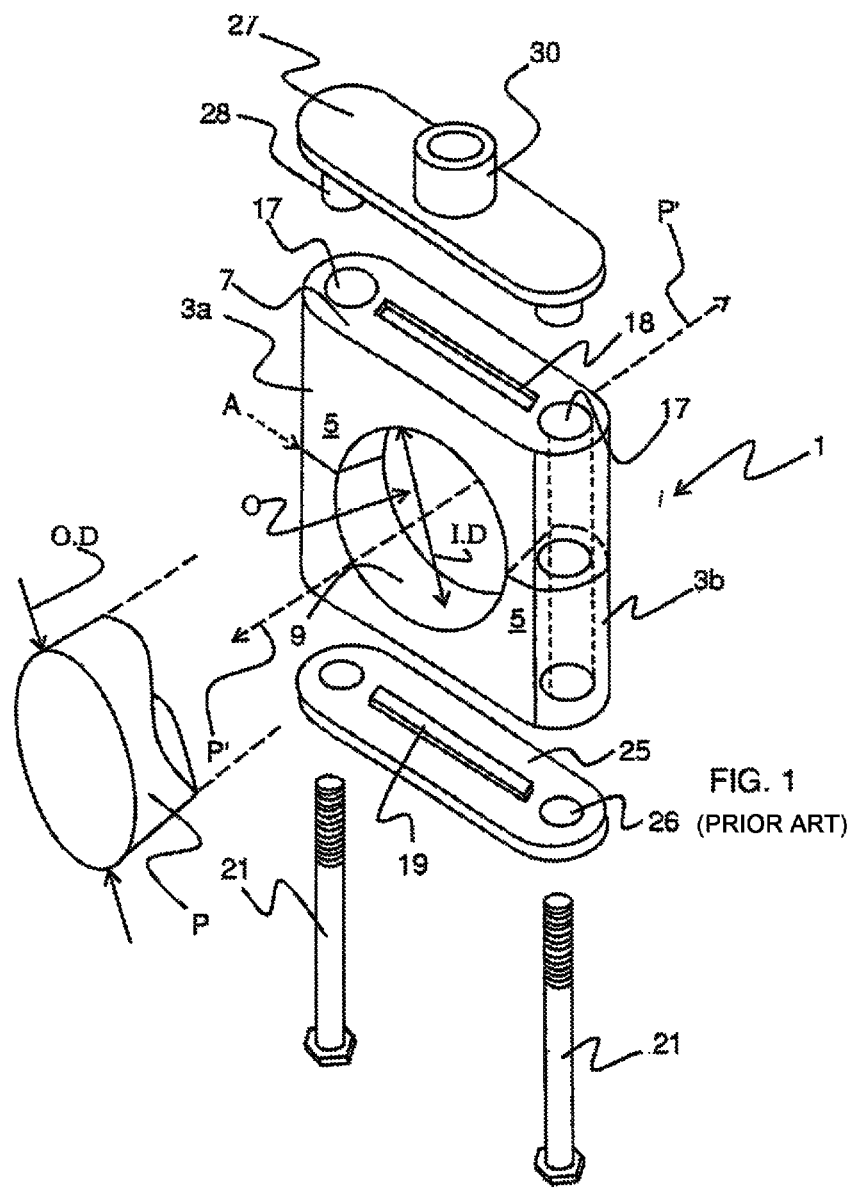
FIG. 1 is an exploded isometric assembly view of a typical block style tube and pipe hanger illustrating a grommet lock and framework.

FIG. 1 illustrates a block style pipe and tube grommet block 1 as used in the prior art. The grommet block 1 consists of two attached and substantially identical upper and lower grommets 3 defining a pipe passage zero having an inner diameter (I.D.) through which a pipe, tube, or conduit P having an outer diameter can pass. The two grommets 3 are attachable and also separable along a grommet separation plane A. The O.D. of the pipe can be accommodated by a range of I.D.'s of the grommet block depending on how secure the pipe is to be supported and held by the support. The tighter the tolerance of the pipe O.D., and the grommet block I.D., the more securely the pipe is held. It is to be appreciated that with a larger tolerance the pipe is more inclined or permitted to move or slide axially generally along a pipe axis P' in the pipe passage O. The grommets 3a and 3b can be modified to allow for different pipe sizes, tolerances, etc., so that the pipe, tube or conduit P is either securely held in the pipe passage area O or in the case of a loose fit, the conduit is guided essentially linearly along the pipe axis P' through the pipe passage O.

The grommets 3 have bolt holes 17 that extend through the grommets 3a and 3b in a substantially perpendicular alignment to the pipe axis P' extending through the passage O. To this end, each grommet 3 is comprised of a pair of oppositely disposed legs 5 through which a bolt hole 17 is formed, a substantially flat top surface 7 against which a portion of the frame work is generally secured, a curved inner surface 9 defining the I.D. of the passage O and each leg 5 having a substantially planar end surface 11 for mating engaging with a corresponding planar end surface of an opposing grommet. The top surface 7 of each grommet 3 may be provided with a detent or slot 18 for receiving a corresponding protrusion or key 19 formed in an attachment plate 25 and 27, or even another grommet. Such a detent or slot and protrusion or key 19 would facilitate maintaining alignment of the bolt holes 17 of the grommet with the holes 26 in the attachment plate 25 as set forth in further detail. The union of detent 18 and the protrusion 19 would also form a compression fit or some other means of attachment to enable connecting of the attachment plates 25 and 27 to the grommets 3 until a bolt 21 can be inserted through the attachment plate hole 26 and the bolt hole 17 of the grommet to be secured by a threaded receiver 28 of the corresponding attachment plate. In FIG. 1, bolts 21 are shown being inserted from the lower attachment plate 25.

The attachment plates 25, 27 form a framework that consist of a pair of bolts 21 which extends through the attachment plate holes 26 and bolt holes 17 of the grommets 3 and connect and secure the attachment plates 25, 0.27 and grommets 3 together as illustrated in FIG. 1. During assembly, after passing through the holes 26 in the bottom attachment plate 25 and bolt holes 17 in the grommets 3a and 3b and coming out the other end, the bolts 21 connect to either the secured threaded receiver 28 in conjunction with the top attachment plate 27, or a nut supported on or in conjunction with the top plate 27 to complete assembly of the framework. The attachment plate 27 includes a hanger attachment receiver 30 which may connect to a hanger rod by threaded fasteners or by welding and thence to an attachment plate as part of suspension assembly which supports the pipes support and pipe to a floor or ceiling. The top and bottom attachment plates 25, 27 are pulled essentially flush against the grommets top surfaces 7 when the bolts 21 are tightened into the receiver 28 or a separate nut.

Figure 2:
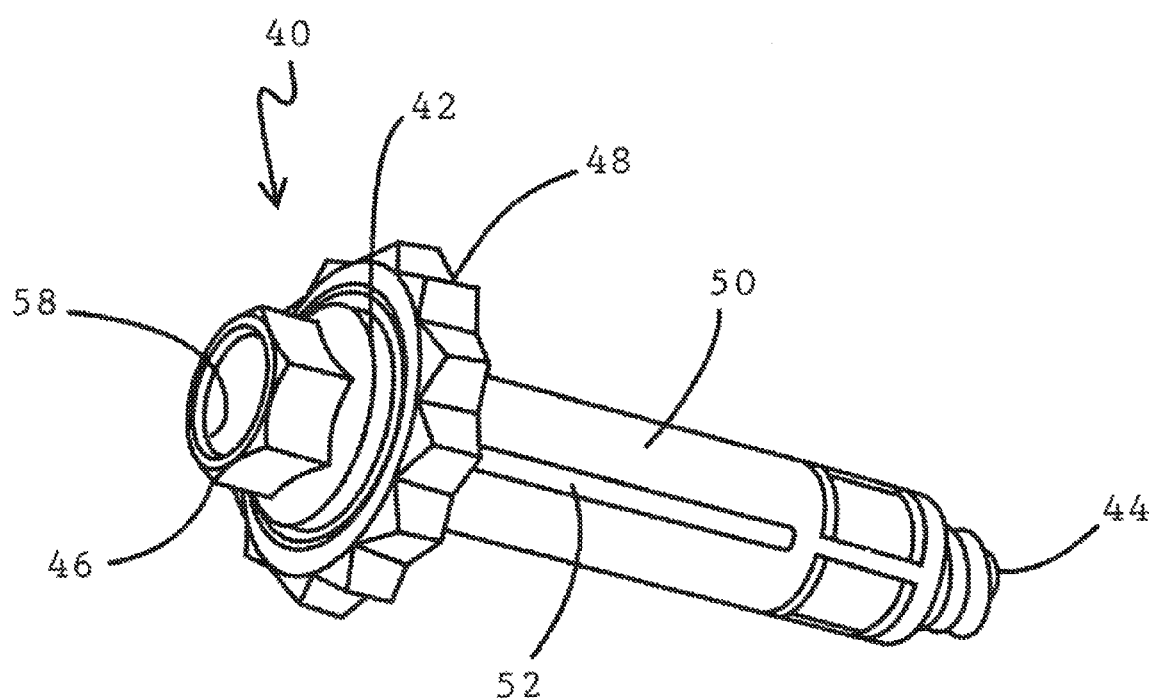
FIG. 2 is a perspective view of a toggle bolt assembly suitable for use with Applicant's anchor bracket.
Figure 3:
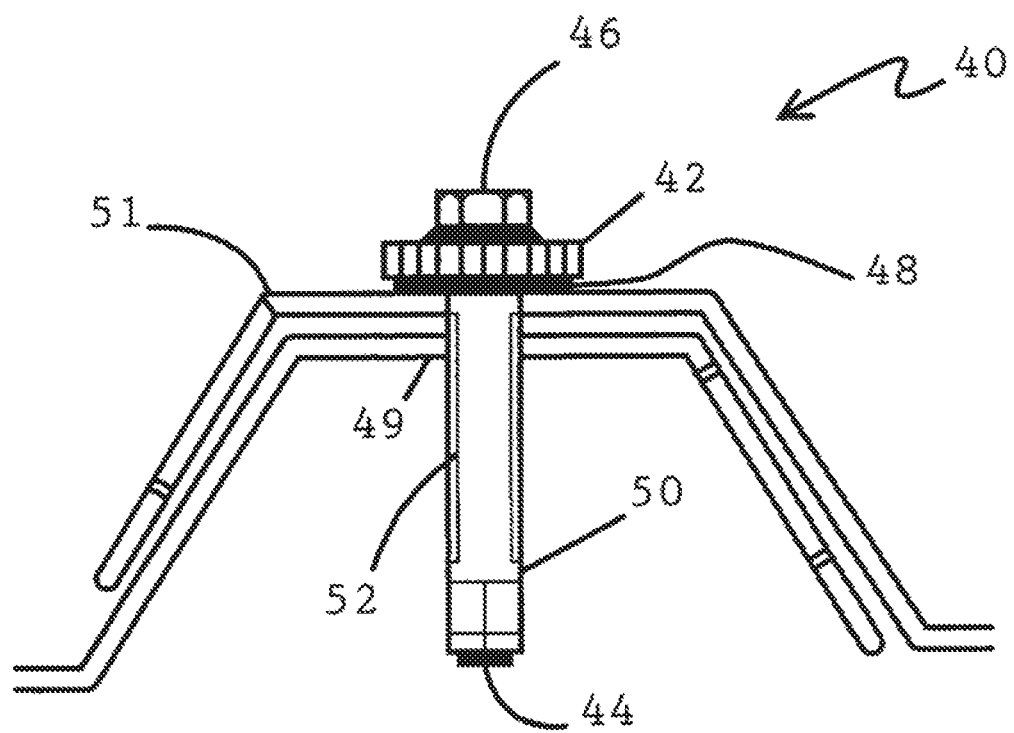
FIG. 3 is a side view of the toggle bolt of FIG. 2 inserted through a panel.
Figure 3A:
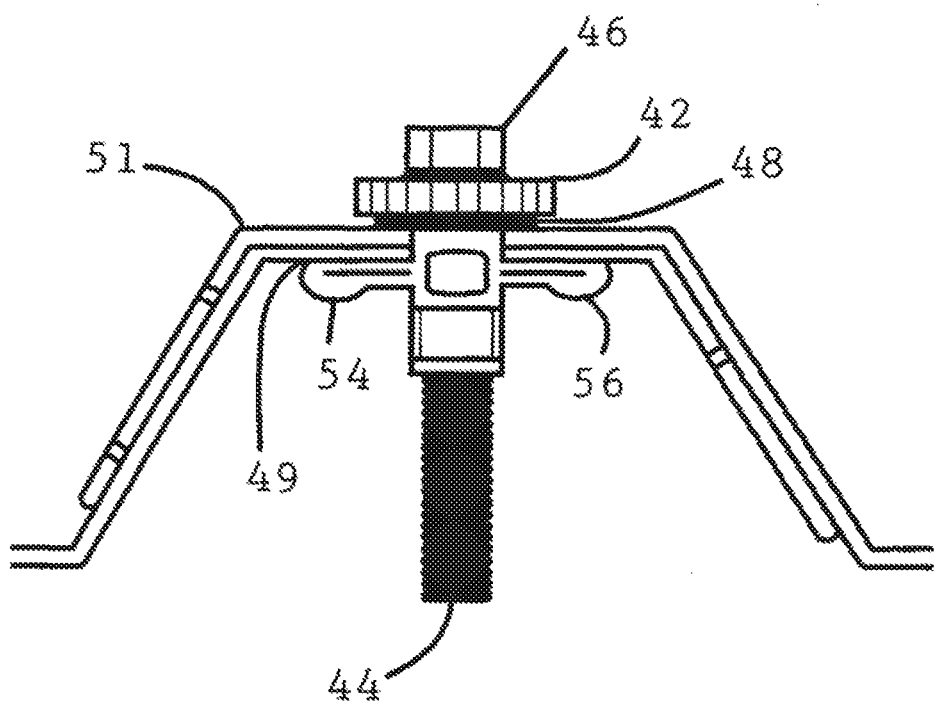
FIG. 3A is a side view of the toggle bolt of FIGS. 2 and 3 in closed or secure orientation.

FIG. 2 is a perspective view of a toggle bolt assembly suitable for use with Applicant's support plate, FIG. 3 is a side view of the toggle bolt of FIG. 2 inserted through a panel, and FIG. 3A is a side view of the same toggle bolt of FIGS. 2 and 3 in a closed or locked position. In FIG. 2, toggle bolt 40 is illustrated in its configuration for installation. The toggle bolt consists of a hex washer head machine screw 42 having an externally threaded shaft 44, and a hex head 46. Positioned adjacent the hex head 46 is a sealing washer 48. Positioned on the shaft 44 is a slotted aluminum sleeve 50, having a plurality of longitudinal slots 52 about its periphery.

The toggle bolt 40 as illustrated in FIG. 2 would be inserted through an aperture 49 in the panel 51, the aperture 49 being substantially identical to the circumference of the slotted aluminum sleeve 50. Once inserted through such aperture 49 through the panel, the sealing washer 48 would be juxtaposed the outer surface of the panel 51. The installer would then manipulate the hex washer head machine screw 42 by rotating said screw via the hex head 46, and in turn rotating the shaft 44 which would cause the slotted aluminum sleeve 50 to collapse towards the hex head 46 and the sealing washer 48 until it achieved the configuration as illustrated in FIG. 3A, wherein the slotted aluminum sleeve has now been transformed into a T-shape with two extended arms 54 and 56 having been formed by the collapsing of the slotted aluminum sleeve 50, aided by the peripheral longitudinal slots 52 formed therein. In this configuration, the only visible portion of the toggle bolt assembly 10 would be the hex head 46 and the sealing washer 48. The remainder of the assembly would be on the opposing side of the panel and not viewable or accessible. The hex head 46 of the toggle bolt assembly has an internal bore 58, internally threaded for receipt of the male end of a separate fastener.

Figure 4:
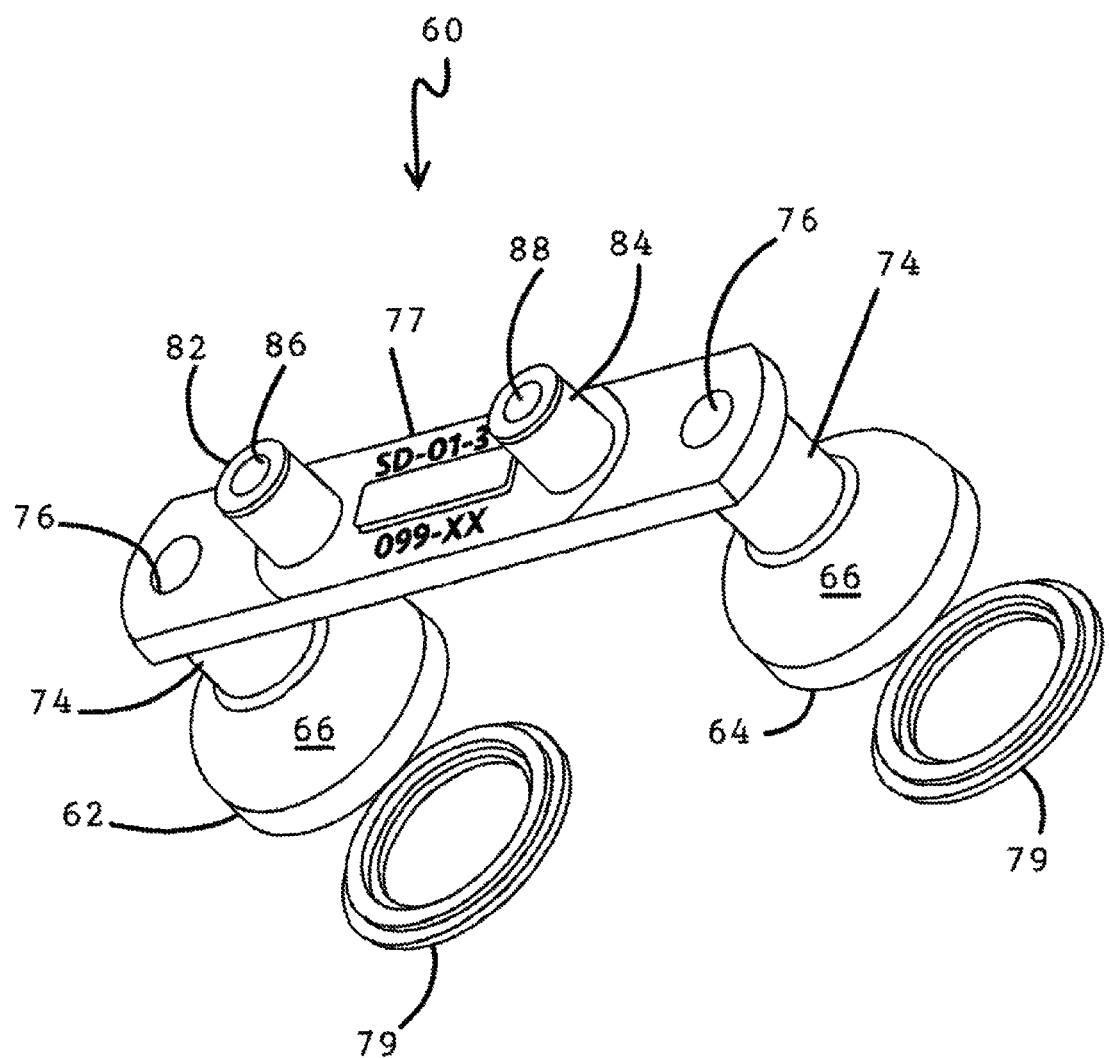
FIG. 4 is a perspective isometric view of the anchor bracket of Applicant's invention used to secure a block style tube and pipe hanger to a panel.
Figure 5:
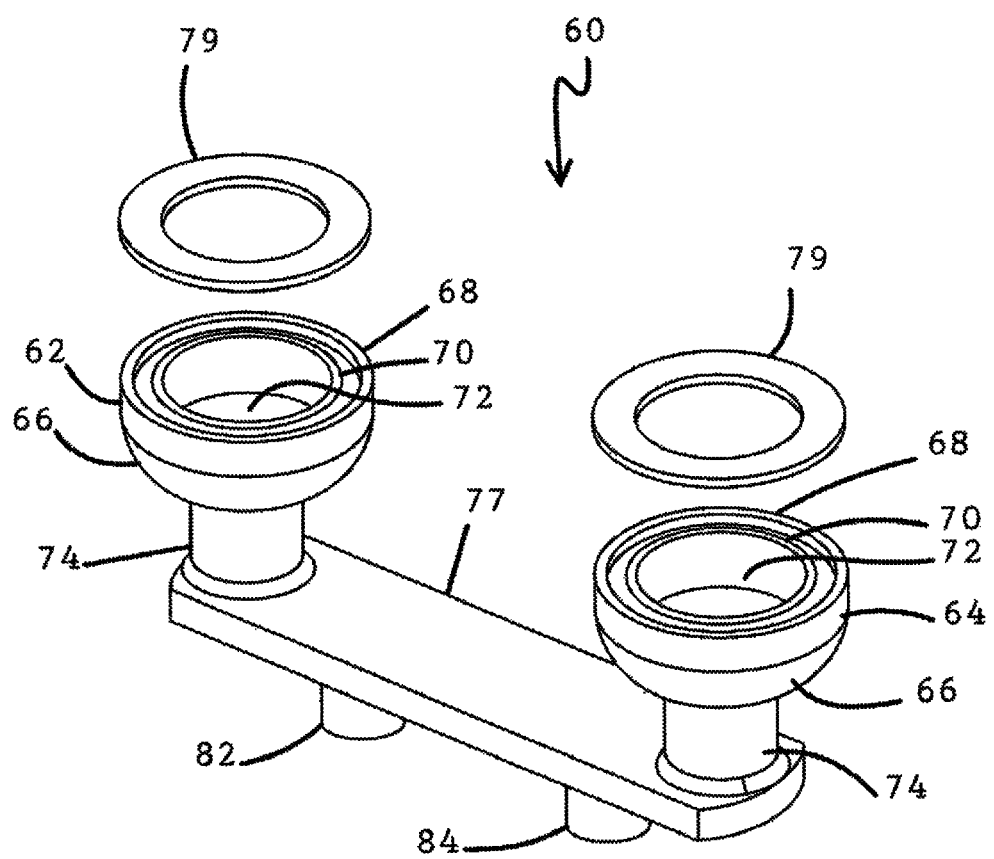
FIG. 5 is a perspective isometric bottom view of the anchor bracket of FIG. 4.

FIG. 4 is a perspective isometric view of an anchor bracket 60 of Applicant's invention used to secure a block style tube and pipe hanger to a panel, and FIG. 5 is a perspective isometric view of the bottom of anchor bracket 60 of FIG. 4. Anchor bracket 60 is comprised of two pedestals 62 and 64, the lower portions 66 of pedestals 62 and 64 are hollow and as best illustrated in FIG. 5, which a perspective bottom view of the anchor bracket 60, which consists of concentric walls 68 and 70 surrounding a cavity 72, the concentric walls providing additional support to the base of the pedestals. The cavity 72 in cooperation with the concentric walls 68 and 70 also provides a structure which allows for the use of an O-ring seal or a sealing pad 79 to insure that the cavity covers the toggle bolt-like fastener and also prevents the cavity from becoming a depository for bacteria growth or the like. The pedestals 62 and 64 narrow from the base upwardly comprising a generally cylindrical portion 74 through which there is a bore 76 extending downwardly and in communication with the cavity 72 of the base portions.

The pedestals 62 and 64 are secured by a generally planar cross member 77, through which bores 76 extend. Formed on planar cross member 77 are two receiver receptacles 82 and 84 each having a bore 86 and 88 formed therein, the bore being internally threaded. Anchor bracket 60 may be of one piece construction, but it would be recognized by those of ordinary skill in the art that it may be formed of separate elements which are heat welded to form the anchor bracket 60.

Figure 6:
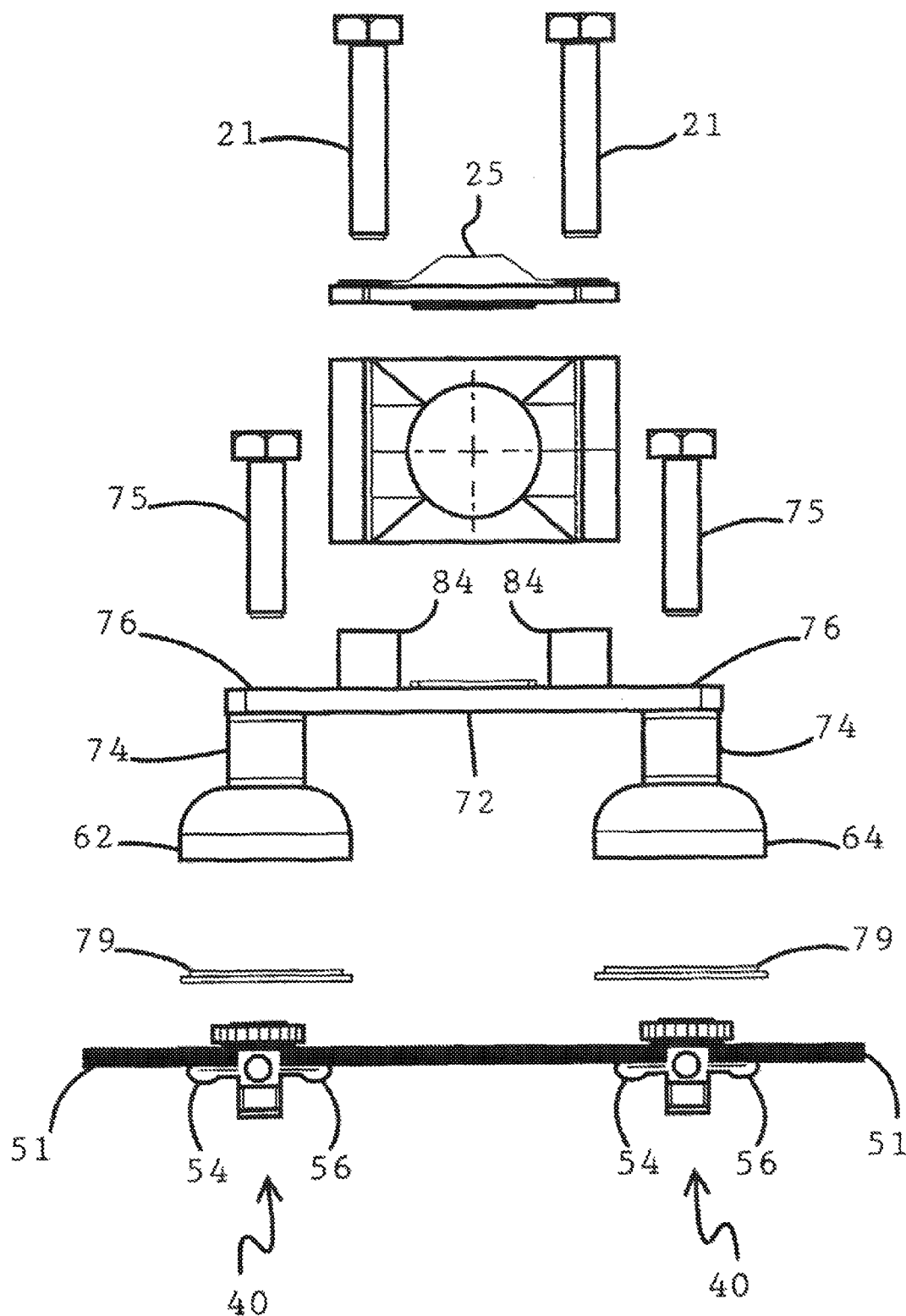
FIG. 6 is an exploded view of a block style tube and pipe hanger in conjunction with Applicant's anchor bracket.

In installation of a block style tube and pipe hanger as illustrated in FIG. 6 which is an exploded view, toggle bolts of the type illustrated in FIGS. 2 and 3 would be inserted through a panel after determining the correct distance between the two toggle bolts and any slope, alignment, or centerline requirement for the installation of the tubing or pipe. Once the toggle bolts were in secure position (FIG. 3A) with the panel, anchor bracket 60 would be positioned over the hex head 46 and sealing washer 48 of the toggle bolt. The hex head 46 and sealing bolt 48 would be receivable within the cavity 72 formed in the lower portion of each of the pedestals. Threaded fasteners 75 would then be inserted through the bores 76 in the cross member 77, through the bores 76 in the cylindrical portion of the pedestals and threadedly secured to the internally threaded bores 58 formed in the hex head 46 of the toggle bolt. In this fashion, the support plate 60 is now secured to the panel in the desired location and appropriate angle and the hex head 46 and sealing washer 46 are covered.

At this point of the installation, a tube or pipe would be positioned proximate the anchor bracket 60 having a block style tube and pipe hanger positioned thereabout. The bolts 21 utilized with the hardware to secure the grommets of the block style tube and pipe hanger together would be inserted through the respective attachment plates 25 and 27, and extend beyond the opposing attachment plate such that the bolts 21 could be secured into the female upstanding receiving receptacles 82 and formed on cross member 77. In this manner, a block style tube and pipe hanger may be affixed to the anchor bracket 60 and thus to a panel to which there is no access to the reverse side.

The lower portion 66 of pedestals 62 and 64 can be formed with a washer or sealing means 79 between the concentric support walls to effectuate a seal between the pedestals and the panel and completely encapsulate and protect the hex head and sealing washer of the toggle bolt. This is of particular importance when installed in a clean, sanitary, or sterile room.

FIG. 6 is an exploded view of the block style tube and pipe hanger described and illustrated in FIG. 1 in conjunction with the anchor bracket 60 of FIG. 4.

Therefore, while the present invention has been disclosed with respect to the preferred embodiments thereof, it will be recognized by those of ordinary skill in the art that various changes and modifications can be made without departing from the spirit and scope of the invention. It is therefore manifestly intended that the invention be limited only by the claims and the equivalence thereof.

I claim:
1. A hygienically sealable anchor bracket for hollow panels or walls for block style pipe and tube hangers wherein said panels or walls have non-accessible rear surfaces, said hygienically sealable anchor bracket comprising:

a toggle bolt assembly for insertion through and securing to a hollow panel or wall, said toggle bolt assembly having an internally threaded bore formed in said toggle bolt assembly;

an anchor bracket defined by a cross member and a plurality of depending pedestals, said pedestals positioned over two adjacent secured toggle bolt assemblies forming a seal about said toggle bolt assembly, said cross member having a throughbore associated with each said depending pedestal and a securing means passing through said throughbore and engaging with said internally threaded bore on said toggle bolt assembly, securing said anchor bracket to said hollow panel or wall and covering and sealing said exposed toggle bolt assembly, said cross member further having two upwardly extending receptacles having internally threaded bores for securing a block style pipe and tube hangers for embracement with a diameter of a pipe or tube.

2. The hygienically sealable anchor bracket in accordance with claim 1 wherein said toggle bolt assembly includes a toggle bolt having a geometrically shaped head unitary with an externally threaded shaft and unitary annular washer positioned adjacent and beneath said geometrically shaped head, said geometrically shaped head further having the internally threaded bore longitudinally in alignment with said externally threaded shaft.

3. The hygienically sealable anchor bracket in accordance with claim 2 wherein said externally threaded shaft of said toggle bolt assembly has a sealing washer disposed on said shaft adjacent and beneath said unitary annular washer.

4. The hygienically sealable anchor bracket in accordance with claim 3 wherein said depending pedestals are secured to said cross member at a first end, a second end of said depending pedestals being flared to form a recessed cavity sized to cover said geometrically shaped head and said unitary washer and said sealing washer of said toggle bolt assembly on an exterior of said hollow panel or wall.

5. The hygienically sealable anchor bolt in accordance with claim 4 whereas said sealing washer is disposed on said second ends of said pedestals, abutting said hollow panel or wall, and protecting said geometrically shaped head of said anchor bolt assembly from contamination.

6. The hygienically sealable anchor bracket in accordance with claim 1 wherein said anchor bracket is securable to said hollow panel or wall with said cross member in a vertical orientation to accommodate block style pipe and tube hangers for pipe and tube in a horizontal orientation.

7. A hygienically sealable anchor bracket in accordance with claim 1 wherein said anchor bracket is securable to said hollow panel or wall with said cross member in a horizontal orientation to accommodate block style pipe and tube hangers for pipes and tubes in a vertical or sloped orientation.

8. A hygienically sealable anchor bracket for hollow panels or walls for block style pipe and tube hangers wherein said panels or walls having non-accessible rear surfaces, said hygienically sealable anchor bracket comprising:

a toggle bolt assembly having a geometrically shaped head, a unitary externally threaded shaft, a sealing washer disposed on said externally threaded shaft adjacent and beneath a unitary washer, a slotted aluminum sleeve disposed on said shaft, said geometrically shaped head further having an internally threaded bore in alignment with said unitary externally threaded shaft, said externally threaded shaft and said sleeve inserted in an aperture in said hollow panel and wall and rotated to collapse said slotted sleeve against said hollow panel or wall securing said toggle bolt assembly;

an anchor bracket having at least two spaced apart pedestal legs joined at a first end by a cross member, a second end of said pedestal legs flared to form a recessed cavity sized to cover said geometrically shaped head and said unitary washer and said sealing washer of said toggle bolt assembly, two bores formed in cross member in alignment with depending pedestal legs and extending through said pedestal legs and in communication with said recessed cavity, each of said bores for receipt of an externally threaded securing means securable to said internal threaded bore on said geometrically shaped head of said toggle bolt securing said anchor bracket to said hollow panel or wall;

two upwardly extending receptacles positioned on said cross member, said receptacles having internally threaded bores for receipt of said externally threaded securing means securing grommets of a block style pipe and tube hanger to said anchor bracket and said hollow panel or wall.

9. The hygienically sealable anchor bracket in accordance with claim 8 wherein a sealing pad is disposed on said second ends of said pedestal legs and positioned between said second end of said pedestal legs and said abutting hollow panel for wall sealing said cavity from exposure to contamination.

10. The hygienically sealable anchor bracket in accordance with claim 8 wherein said anchor bracket is secured to said hollow panel or wall with said cross member in a vertical orientation to accommodate block style pipe and tube hangers for pipe and tube in a horizontal orientation.

11. The hygienically sealable anchor bracket in accordance with claim 8 wherein said anchor bracket is securable to said hollow panel or wall and said cross member is positioned in a horizontal orientation to accommodate block style pipe and tube hangers for pipe and tube in a vertical orientation.

12. Method for securing a block style pipe and tube hanger to a hollow panel or wall to which the reverse side is nonaccessible, the method comprising:

positioning a toggle bolt assembly in said hollow tube or wall, said toggle bolt assembly having an internally threaded bore in a geometric head of said toggle bolt assembly;

fabricating an anchor bracket having a cross member and at least two depending pedestal legs each secured at a first end to said cross member and each having a flared second end, said flared second ends engaging two adjacent toggle bolt assemblies in said hollow panel or wall, positioning said anchor bracket pedestal legs over said toggle bolt assemblies and securing said anchor bracket to said toggle bolt assemblies by means of throughbores through said cross member and said depending pedestals legs by means of an externally threaded securing means engaging said internally threaded bore in said toggle bolt assembly;

securing a block style pipe and tube hanger having two complimentary grommets to said anchor bracket using externally threaded securing means securing said complimentary grommets and simultaneously securing block style pipe and tube hanger to upstanding internally threaded receptacles formed on said cross member of said anchor bracket.

13. The method for securing a hygienically sealable anchor bracket in accordance with claim 12 wherein said anchor bracket is secured to said hollow panel or wall with said cross member in a vertical orientation to accommodate block style pipe and tube hangers for pipe and tube in a horizontal orientation.

14. The hygienically sealable anchor bracket in accordance with claim 12 wherein said anchor bracket is secured to said hollow panel or wall with said cross member in a horizontal orientation to accommodate block style pipe and tube hangers for pipe and tube in a vertical orientation.

\* \* \* \* \*